(12) United States Patent
Ogasahara

(10) Patent No.: US 9,037,004 B2
(45) Date of Patent: May 19, 2015

(54) OPTICAL RECEIVER, POLARIZATION SEPARATION DEVICE AND POLARIZATION SEPARATING METHOD

(75) Inventor: Daisaku Ogasahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 34 days.

(21) Appl. No.: 13/990,968

(22) PCT Filed: Jun. 15, 2011

(86) PCT No.: PCT/JP2011/064199
§ 371 (c)(1),
(2), (4) Date: May 31, 2013

(87) PCT Pub. No.: WO2012/105070
PCT Pub. Date: Aug. 9, 2012

(65) Prior Publication Data
US 2013/0251370 A1  Sep. 26, 2013

(30) Foreign Application Priority Data
Feb. 1, 2011 (JP) ................. 2011-019908

(51) Int. Cl.
*H04B 10/06* (2006.01)
*H04B 10/61* (2013.01)
*H04J 14/06* (2006.01)
*H04B 10/00* (2013.01)

(52) U.S. Cl.
CPC ........ *H04B 10/6162* (2013.01); *H04B 10/6166* (2013.01); *H04J 14/06* (2013.01)

(58) Field of Classification Search
CPC ........... H04B 10/2569; H04B 10/2572; H04B 10/614; H04B 10/6162; H04B 10/6166
USPC ............. 398/202, 205, 206, 208, 65, 209
See application file for complete search history.

(56) References Cited

U.S. PATENT DOCUMENTS

2009/0214201 A1  8/2009  Oda et al.
2010/0003028 A1*  1/2010  Zhang et al. ............ 398/65

FOREIGN PATENT DOCUMENTS

JP  2009-198364 A  9/2009
JP  2009-253972 A  10/2009

OTHER PUBLICATIONS

M.El-Darawy, et al., "Performance of Modified Decision-Directed Polarization Control/Demultiplex Algorithm in Coherent QAM Receiver", OSA/OFC/NFOEC, 2010.
International Search Report for PCT/JP2011/064199, dated Sep. 27, 2011.

* cited by examiner

*Primary Examiner* — Daniel Dobson
(74) *Attorney, Agent, or Firm* — Sughrue Mion, PLLC

(57) ABSTRACT

Provided is a polarization separation device which converges filter coefficients used in polarization separating process more quickly.
The polarization separation device according to the present invention comprises: a first filter means 11 which applies filtering process on each of first and second input signals, which are detected from an received optical signal, with elements of a characteristic matrix representing the inverse characteristics of an optical transmission path as filter coefficients, and uses each of the filtered signals to output a first output signal; a second filter means 12 which applies filtering process on each of the first and second input signals with the other elements of the characteristic matrix as filter coefficients, and uses each of the filtered signals to output a second output signal; a filter coefficient update means 13 which updates the first filter coefficients using a relation between the elements of the characteristic matrix so as to further reduce both error signals of the first and second output signals; and a filter coefficient update means 14 which updates the second filter coefficients using the relation between the elements of the characteristic matrix so as to further reduce both error signals to the first and second output signals.

11 Claims, 5 Drawing Sheets

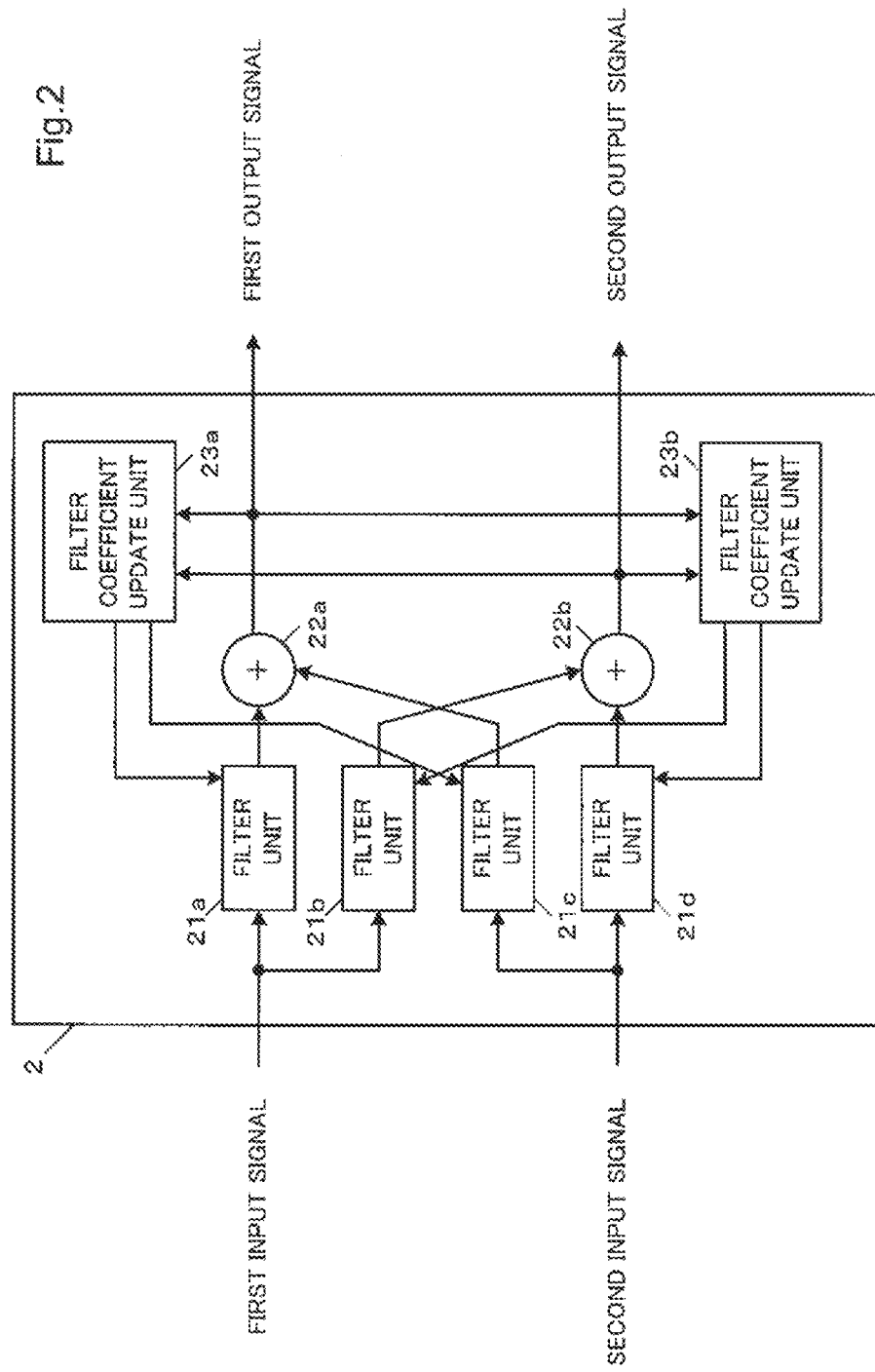

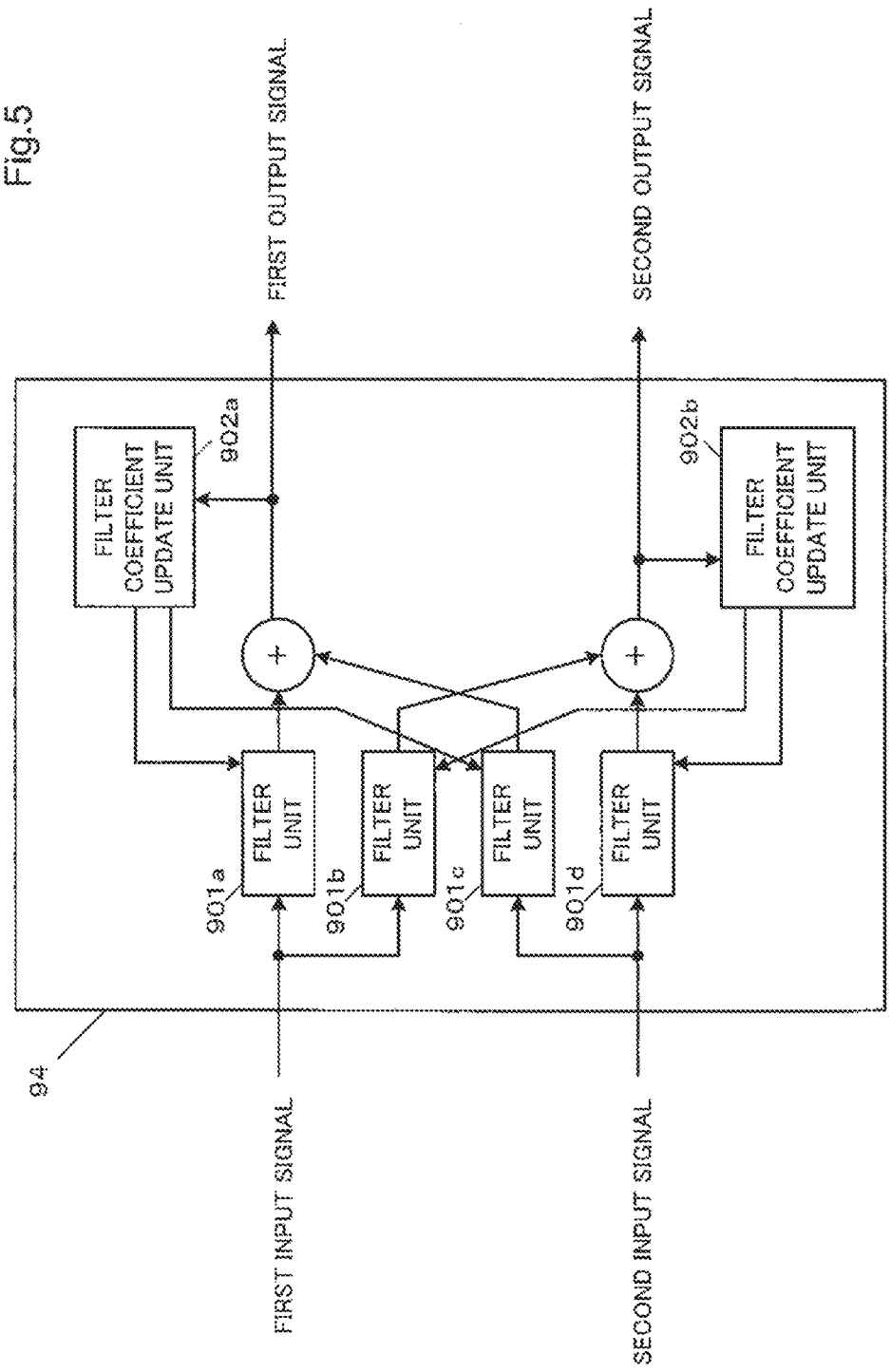

OPTICAL RECEIVER, POLARIZATION SEPARATION DEVICE AND POLARIZATION SEPARATING METHOD

CROSS REFERENCE TO RELATED APPLICATIONS

This application is a National Stage of International Application No. PCT/JP2011/064199 filed Jun. 15, 2011, claiming priority based on Japanese Patent Application No. 2011-019908 filed Feb. 1, 2011, the contents of all of which are incorporated herein by reference in their entirety.

TECHNICAL FIELD

The present invention relates to an optical receiver, a polarization separation device and a polarization separating method in a polarization multiplex and demultiplex optical communication system.

BACKGROUND ART

In recent years, with the spread of a network such as the internet, the traffic volume of a backbone network is increasing rapidly. With this change, an ultra high speed optical communication system like 100 Gbps is desired. As to the technology which realizes the ultra high speed optical communication system, an optical phase modulation method and a polarization multiplex and demultiplex technology have been watched with interest.

Unlike a conventional light intensity modulation method which performs data modulation to the light intensity of the transmission laser beam, the optical phase modulation method is a method to perform data modulation to the phase of the transmission laser beam. As for the optical phase modulation method, QPSK (Quadrature Phase Shift Keying), 8PSK (8 Phase Shift Keying), and QAM (Quadrature Amplitude Modulation) and so on are known. In the optical phase modulation method adopting these data modulation methods, symbol rate (baud rate) can be decreased by assigning a plurality of bits to one symbol. For this reason, the optical phase modulation method can reduce operation speed of an electric device. Also, as a result, in the optical phase modulation method, reduction in production cost of the apparatus can be expected. For example, when QPSK is used, 2 bits (for example, 00, 01, 11, 10) are assigned respectively to four of optical phases (for example, 45 degrees, 135 degrees, 225 degrees, 315 degrees). For this reason, the symbol rate of QPSK can be reduced to 1/2 of symbol rate (that is, bit rate) of the light intensity modulation method.

In order to receive signal light modulated by the optical phase modulation, an optical coherent method is used. This is a method which combines the signal light with the laser beam having a frequency almost the same as the signal light (which is called local oscillation light) by an optical element called a 90-degree hybrid and thereby receives the output by a photoelectric detector. Here, for the sake of making description simple, it is supposed that polarization states of the signal light and the local oscillation light are the same linear polarization. When the optical coherent method is used, an alternating current component of an electric signal outputted from the photoelectric detector is a beat signal of the signal light and the local oscillation light. And, amplitude of the beat signal is proportional to the light intensity of the signal light and the local oscillation light. And, phase of the beat signal will be the phase difference between the signal light and the local oscillation light when a carrier wave frequency of the signal light and a frequency of the local oscillation light are identical. When the phase of the local oscillation light is identical to the phase of the laser beam inputted to an optical modulator in a transmission end, the phase of the beat signal is the phase given to the laser beam at the transmission end. For this reason, it is possible to demodulate transmission data by converting the phase of the beat signal into a bit string using symbol mapping.

Actually, the values of the carrier wave frequency of the signal light and the frequency of the local oscillation light are not identical perfectly. Further, the phase of the local oscillation light in an optical receiver and the phase of the laser beam inputted to the optical modulator in an optical transmitter are not identical either. Accordingly, it is necessary to compensate the influence caused by the optical phase deviation that is the phase difference between the signal light inputted to the optical modulator in the optical transmitter and the local oscillation light. Further, it is necessary to compensate the influence caused by the optical carrier wave frequency deviation that is the difference between the carrier wave frequency of the signal light in the optical transmitter and the frequency of the local oscillation light. However, as the specific method for compensating the optical phase deviation and the optical carrier wave frequency deviation is not particularly required for describing the present invention, the description will be omitted.

On the other hand, the polarization multiplex and demultiplex technology has also been watched with interest as one of the technologies to realize the ultra high speed optical communication system. In the polarization multiplex and demultiplex technology, the optical transmitter multiplexes two independent optical signals, which have carrier waves deployed in an identical frequency band and the polarization states are orthogonal to each other, and thereby transmits. Further, the optical receiver separates the above-mentioned two independent optical signals from a received signal. As a result, the polarization multiplex and demultiplex technology realizes double transmission rates. In other words, it is possible to reduce operation speed of an electric device and thereby can reduce the apparatus cost because the polarization multiplex and demultiplex technology can make symbol rate (baud rate) of an optical signal 1/2.

By combining both of the optical phase modulation method and the polarization multiplex and demultiplex technology mentioned above, the ultra high speed optical communication system like 100 Gbps can be realized. The process to compensate the optical carrier wave frequency deviation and the optical phase deviation, and the process to separate to two independent optical signals (polarization separating process) can be realized by a digital signal processing circuit implemented by LSI (Large Scale Integration) or the like. The technology which demodulates transmission data with a high degree of accuracy using the digital signal processing circuit like this is called an optical digital coherent communication system.

In the following, receiving process in the ultra high speed optical communication system using the optical digital coherent communication system will be described with reference to drawings.

FIG. 4 is a block diagram showing a configuration of an optical receiver 90 of related art in the optical communication system using the optical digital coherent communication system. The optical receiver 90 inputs a received optical signal from an optical transmission path to a 90-degree hybrid 91 together with the local oscillation light having a frequency almost the same as the carrier wave frequency of the received optical signal. The 90-degree hybrid 91 outputs total of four optical signals which are real part components and imaginary part components of optical signals having the polarization states parallel to each of two orthogonal polarization axes. These four optical signals, after having been converted into analog electric signals by photoelectric detectors 92a-92d, are converted into digital electric signals by analog digital converters (hereinafter, described as ADC) 93a-93d. These digital electric signals, after having been converted into the digital electric signals sampled with symbol rate (baud rate) of the received optical signal by a re-sampling unit, which is not illustrated, are inputted to a polarization separation device 94. The polarization separation device 94, based on four inputted digital electric signals, extracts the electric signals corresponding to two independent optical signals being polarization multiplexed. With respect to each of the extracted electric signals, optical phase rotation caused by the optical carrier wave frequency deviation and the optical phase deviation between the received optical signal and the local oscillation light is compensated by optical carrier wave frequency deviation and optical phase deviation compensation units 95a-95b respectively. After that, each of the electric signals is demodulated to the original transmission bit string by symbol discrimination units 96a to 96b respectively.

As described above, this optical receiver 90 of the related art operates as follows. That is, with combining the optical phase modulation method and the polarization multiplex and demultiplex technology, the optical receiver 90 compensates the influence to each of the electric signals corresponding to two independent optical signals separated by polarization separation by the optical carrier wave frequency deviation and the optical phase deviation. As a result, the optical receiver 90 of the related art can realize the ultra high speed optical communication system like 100 Gbps.

Next, the polarization separation device 94 provided in the optical receiver 90 of the related art will be described.

FIG. 5 is a block diagram showing a configuration of the polarization separation device 94. As shown in FIG. 5, the polarization separation device 94 includes a filter units 901a-901d and filter coefficient update units 902a-902b. Further, in FIG. 5, an input signal 1 is an electric signal corresponding to the optical signal having the polarization state parallel to one of two orthogonal polarization axes in the 90-degree hybrid 91 in FIG. 4. That is, this input signal 1 is represented by a complex number which includes the digital electric signal outputted from ADC 93a of FIG. 4 as a real part component and the digital electric signal outputted from ADC 93b as an imaginary part component.

Similarly, an input signal 2 of FIG. 5 is an electric signal corresponding to the optical signal having the polarization state parallel to the other of two orthogonal polarization axes in the 90-degree hybrid 91 in FIG. 4. That is, this input signal 2 is represented by a complex number which includes the digital electric signal outputted from ADC 93c of FIG. 4 as a real part component and the digital electric signal outputted from ADC 93d as an imaginary part component.

An output signal 1 and an output signal 2 of FIG. 5 are signals which will be regenerated as the electric signals corresponding to two independent optical signals having been polarization multiplexed in the optical transmitter respectively.

The filter units 901a-901d of FIG. 5 perform filtering process of the input signal 1 and the input signal 2 respectively using filter coefficients set to each of the filter units independently. After that, the summation of the filter unit 901a and the filter unit 901c is outputted as the output signal 1. The summation of the filter unit 901b and the filter unit 901d is outputted as the output signal 2. Further, as the filter units 901a-901d, general FIR (Finite Impulse Response) filters can be used.

The filter coefficient update unit 902a updates the filter coefficients of the filter units 901a and 901c according to predetermined algorithm. Similarly, the filter coefficient update unit 902b updates the filter coefficients of the filter units 901b and 901d. As the algorithm for the filter coefficient update units 902a-902b to update each of the filter coefficients, CMA (Constant Modulus Algorithm) is widely used. CMA is the algorithm which controls each of the filter coefficients of the filter units 901a-901d adaptively so that an envelope of the extracted electric signal may become fixed, that is, the strength may become fixed, and thereby performs polarization separation. Additionally, as the algorithm which updates the filter coefficients of each of the filter units, the LMS (Least Mean Square) algorithm is also general (refer to non-patent document 1), however, an example using CMA will be described here.

An example of error functions defined in CMA are indicated in the following formula (1).

$$J_x(W, W^H) = E[(r_x^2 - |E'_x|^2)^2], J_y(W, W^H) = E[(r_y^2 - |E'_y|^2)^2] \quad \text{formula (1)}$$

In formula (1), $Jx(W,W^H)$ is an error function of the output signal 1, and $Jy(W,W^H)$ is an error function of the output signal 2.

Here, W is a matrix which is called Jones matrix of 2×2 of the size representing the inverse characteristics of an optical transmission path. Component-11 (Wxx), component-12 (Wxy), component-21 (Wyx) and component-22 (Wyy) of matrix W are respective filter coefficients of each of the filter units 901a-901d. Matrix $W^H$ is the Hermitian conjugate of matrix W.

Further, here, although the number of taps of the filter unit is supposed to be 1 for the sake of making description simple, the number of taps may be 2 or more. Further, rx and ry are respective target values of amplitude of the output signal 1 and the output signal 2. Also, Ex' and Ey' are amplitude of the output signal 1 and the output signal 2 respectively. Further, E[x] represents an expectation value of x.

The filter coefficient update unit 902a updates each of the filter coefficients of the filter units 901a and 901c sequentially so that Jx may become the smallest. Also, the filter coefficient update unit 902b updates each of the filter coefficients of the filter units 901b and 901d sequentially so that Jy may become the smallest.

An update formula for the filter coefficient update units 902a and 902b to update the filter coefficient based on the error functions of CMA of formula (1) is indicated in the following formula (2).

$$W_{k+1}^H = W_k^H + \mu \nabla J(W, W^H) = \qquad \text{formula (2)}$$

$$W_k^H + \mu \frac{\partial J(W, W^H)}{\partial W} = W_k^H + \mu \begin{pmatrix} \frac{\partial J}{\partial w_{xx}} & \frac{\partial J}{\partial w_{xy}} \\ \frac{\partial J}{\partial w_{yx}} & \frac{\partial J}{\partial w_{yy}} \end{pmatrix}$$

$$\nabla J(W, W^H) = \frac{\partial J}{\partial W} = \begin{pmatrix} \frac{\partial J}{\partial w_{xx}^*} & \frac{\partial J}{\partial w_{yx}^*} \\ \frac{\partial J}{\partial w_{xy}^*} & \frac{\partial J}{\partial w_{yy}^*} \end{pmatrix} = -2E\left[\begin{pmatrix} e_{xx} & e_{xy} \\ e_{yx} & e_{yy} \end{pmatrix}\right]$$

$$e_{xx} = (r_x^2 - |E'_x|^2) E_x E_x'^*$$

-continued $$e_{xy} = (r_x^2 - |E_x'|^2)E_y E_x'^*$$

$$e_{yx} = (r_y^2 - |E_y'|^2)E_x E_y'^*$$

$$e_{yy} = (r_y^2 - |E_y'|^2)E_y E_y'^*$$

Here, μ is a parameter to stabilize feedback control by adjusting the update amount of the filter coefficient. In calculation of the update amount of the filter coefficient, it is general to substitute an instantaneous value for an expectation value.

Formula (1) is the error functions that are generally used for polarization separation of a polarization multiplexed QPSK signal, and Jx will be 0 when Ex is on a circle with the radius of rx, and similarly, Jy will be 0 when Ey is on a circle with the radius of ry. Because the condition of the error functions Jx and Jy to be 0 is a necessary and sufficient condition for polarization separation to be succeeded, polarization separation is enabled by CMA to update the filter coefficients so that the error functions Jx and Jy will be 0.

Further, other than indicated in formula (1), an error function such that Ex or Ey will be 0 when Ex or Ey exists in any of four symbols of QPSK is also proposed, and is called decision-directed method. Although using formula (1) which is easy for implementing is general because this method is substantially the same as formula (1) with respect to the error function of QPSK, this method has a merit that the method is applicable also to a phase modulation method for a large multiple-value number such as 16QAM to which formula (1) is inapplicable.

As described above, by operation of the filter units 901a-901d and the filter coefficient update units 902a and 902b using CMA of the polarization separation device 94, it becomes possible to separate and extract the electric signals corresponding to two independent optical signals from a received optical signal. As for such filter coefficient updating process in a polarization separation device is also disclosed in patent document 1. Further, another apparatus which performs polarization separating process based on each of signals to be regenerated is also disclosed in non-patent document 2.

THE PRIOR TECHNICAL DOCUMENT

Patent Document

[Patent document 1] Japanese Patent Application Publication No. 2009-253972

Non-Patent Document

[non-patent document 1] B. Farhang-Boroujeny, "Adaptive Filters Theory and Applications", John Wiley & Sons Inc., 1998-11-1, Chap. 6.
[Non-patent document 2] M. El-Darawy et al, "Performance of Modified Decision-Directed Polarization Control/Demultiplex Algorithm in Coherent QAM Receiver", OSA/OFC/NFOEC 2010

SUMMARY OF INVENTION

Technical Problem

However, in the polarization separation device of the related art mentioned above, there is a problem that there may be a case which needs a great deal of time before converging on correct filter coefficients depending on polarization states and a mixed state of two independent optical signals of an optical signal received by an optical receiver.

Object of the Invention

The present invention has been made in view of the above-mentioned problem, and aims at providing a polarization separation device which can converge the filter coefficients used by polarization separating process of a received optical signal more quickly and an optical receiver provided with the same.

Solution to Problem

An optical receiver according to the present invention performs polarization separating process of an optical signal using a polarization separation device which includes: a first filter means which applies filtering process on each of a first input signal and a second input signal, which are detected from an optical signal received via an optical transmission path, with elements of a characteristic matrix representing the inverse characteristics of the optical transmission path as filter coefficients, and uses each of the filtered signals to output a first output signal; a second filter means which applies filtering process on each of the first input signal and the second input signal with different elements from the elements of the characteristic matrix as filter coefficients, and uses each of the filtered signals to output a second output signal; and a first filter coefficient update means which converges the filter coefficients of the first filter means by updating repeatedly, using a relation between the elements of the characteristic matrix and the different elements, so as to further reduce both error signals which represent errors to each of target values of the first output signal and the second output signal.

Further, a polarization separation device according to the present invention is a polarization separation device used in an optical receiver which receives an optical signal via an optical transmission path, and includes: a first filter means which applies filtering process on each of a first input signal and a second input signal, which are detected from the optical signal by the optical receiver, with elements of a characteristic matrix representing the inverse characteristics of the optical transmission path as filter coefficients, and uses each of the filtered signals to output a first output signal; a second filter means which applies filtering process on each of the first input signal and the second input signal with different elements from the elements of the characteristic matrix as filter coefficients, and uses each of the filtered signals to output a second output signal; and a first filter coefficient update means which converges the filter coefficients of the first filter means by updating repeatedly, using a relation between the elements of the characteristic matrix and the different elements, so as to further reduce both error signals which represent errors to each of target values of the first output signal and the second output signal.

A polarization separating method according to the present invention is a polarization separating method of an received optical signal, and includes: applying filtering process on each of a first input signal and a second input signal, which are detected from the received optical signal, with elements of a characteristic matrix representing the inverse characteristics of an optical transmission path, from which the received optical signal having been received, as first filter coefficients, and outputting a first output signal using each of the filtered signals; applying filtering process on each of the first input signal and the second input signal with different elements from the elements of the characteristic matrix as second filter coefficients, and outputting a second output signal using each of the filtered signals; and converging the first filter coefficients by updating, using a relation between the elements of the characteristic matrix and the different elements, so as to further reduce both error signals to the first output signal and the second output signal.

Advantageous Effects of Invention

The present invention can provide a polarization separation device which converges the filter coefficients used in polarization separating process of a received optical signal more quickly, and an optical receiver provided with the same.

BRIEF DESCRIPTION OF THE DRAWINGS

FIG. 2 is a block diagram showing a configuration of a polarization separation device as a second exemplary embodiment of the present invention.

FIG. 5 is a block diagram showing a configuration of the polarization separation device provided in the optical receiver of the related art.

DESCRIPTION OF EXEMPLARY EMBODIMENT

Hereinafter, exemplary embodiments of the present invention will be described in detail with reference to drawings.

First Exemplary Embodiment

Figure 1:
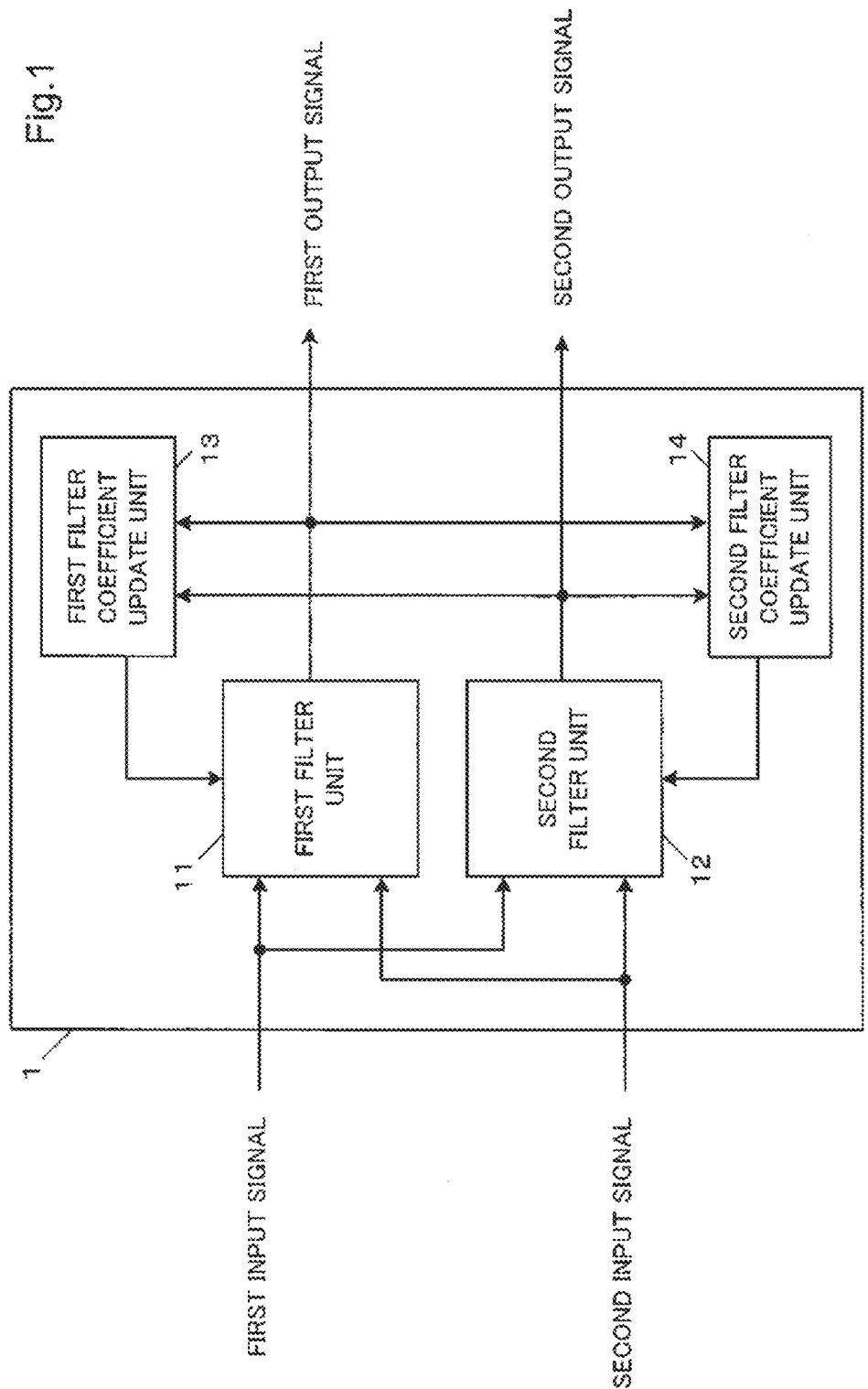
FIG. 1 is a block diagram showing a configuration of a polarization separation device as a first exemplary embodiment of the present invention.

A functional block configuration of a polarization separation device 1 as a first exemplary embodiment of the present invention is shown in FIG. 1. In FIG. 1, the polarization separation device 1 includes a first filter unit 11, a second filter unit 12, a first filter coefficient update unit 13 and a second filter coefficient update unit 14.

Here, the polarization separation device 1 is equipped in a coherent optical receiver. The coherent optical receiver equipped with the polarization separation device 1 receives an optical signal via an optical transmission path. This optical signal may be the one which is polarization multiplexed signal of two independent optical signals in an optical transmitter and transmitted, and the optical signal may be the one which have orthogonal polarization states and identical carrier wave optical frequencies. Further, this coherent optical receiver detects a first input signal and a second input signal from the received optical signal and inputs to the polarization separation device 1.

Figure 4:
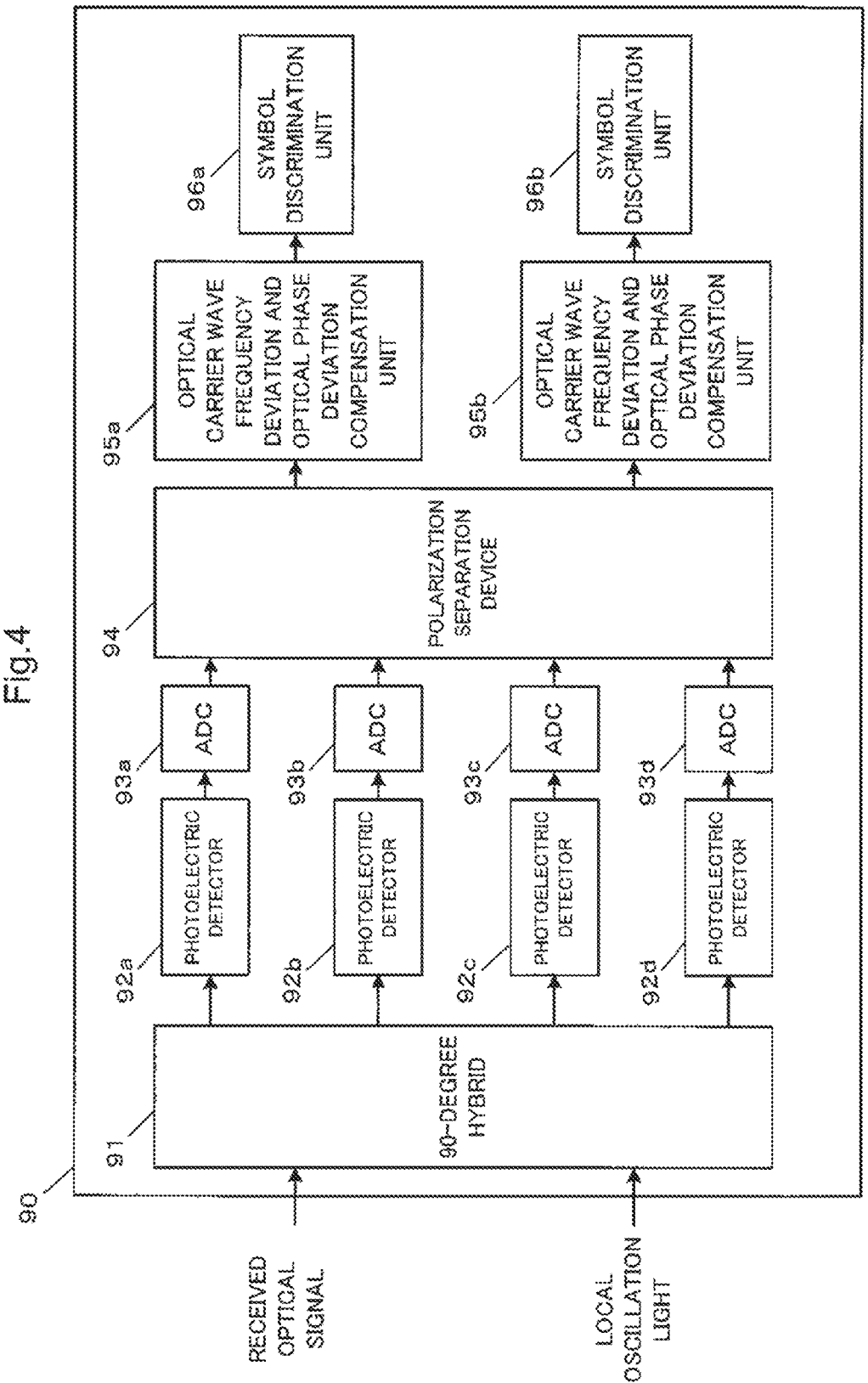
FIG. 4 is a block diagram showing a configuration of the optical receiver of the related art.

For example, this coherent optical receiver may also be the one which performs the same operation as the coherent receiver 90 of the related art shown in FIG. 4. That is, the coherent optical receiver may detect the first input signal and the second input signal by performing AD conversion after inputting the optical signal which the coherent optical receiver has received and the local oscillation light having a frequency almost same as the carrier wave frequency into a 90-degree hybrid. In this case, as mentioned above, the first input signal will be an electric signal corresponding to the optical signal having a polarization state parallel to one of two polarization axes orthogonal to each other. Similarly, the second input signal will be an electric signal corresponding to the optical signal having a polarization state parallel to the other of two polarization axes orthogonal to each other.

The first filter unit 11 applies filtering process on each of the first input signal and the second input signal with elements of a characteristic matrix representing the inverse characteristics of the optical transmission path as filter coefficients, and uses each of the filtered signals to output the first output signal. For example, the first filter unit 11 may output the summation of each of the filtered signals which filtering process has been applied on each of the first input signal and the second input signal as mentioned above as the first output signal. Further, when the optical signal received by the coherent optical receiver is a polarization multiplexed signal of two independent optical signals multiplexed in the optical transmitter, the first filter unit 11 operates as follows. That is, the first filter unit 11 regenerates an electric signal corresponding to one of two independent optical signals as the first output signal.

Here, the characteristic matrix representing the inverse characteristics of the optical transmission path will be described. The characteristics of the optical transmission path can be expressed in a matrix. That is, this matrix is a matrix which associates an input signal to the optical transmission path with an output signal from the optical transmission path. More specifically, when multiplying the input signal to the optical transmission path by "a matrix representing the characteristics of the optical transmission path", the product becomes the output signal from the optical transmission path. Further, the characteristic matrix representing the inverse characteristics of the optical transmission path represents an inverse function (in a narrow sense, an inverse matrix) of the matrix representing the characteristics of such optical transmission path. That is, when the characteristic matrix is applied to the output signal from the optical transmission path, the input signal to the optical transmission path will be obtained.

The second filter unit 12 operates as follows in regard to each of the first input signal and the second input signal. That is, the second filter unit 12 outputs the second output signal using each of the filtered signals on which filtering process has been applied with different elements from the elements used by the first filter unit 11 between the characteristic matrix elements as the filter coefficients. For example, the second filter unit 12 may output the summation of each of the filtered signals on which filtering process of each of the first input signal and the second input signal has been applied as mentioned above as the second output signal. Further, when the optical signal received by the coherent optical receiver is the polarization multiplexed signal of two independent optical signals multiplexed in the optical transmitter, the second filter unit 12 operates as follows. That is, the second filter unit 12 regenerates an electric signal corresponding to the other of two independent optical signals as the second output signal.

The first filter coefficient update unit 13 operates as follows using a relation which exists between the elements used in the first filter unit 11 and the elements used in the second filter unit 12 in the characteristic matrix. That is, the filter coefficients of the first filter unit 11 are adaptively updated so that both amplitude of the error signals to each of the output signals regenerated respectively from the first filter unit 11 and the second filter unit 12 may be further reduced. That is, by repeating this updating process, the first filter coefficient update unit 13 converges the filter coefficients of the first filter unit 11 until both amplitude of the error signals to each of the output signals becomes nearly the smallest.

The second filter coefficient update unit 14 operates as follows using the above mentioned relation which exists between the elements of the characteristic matrix. That is, the filter coefficients of the second filter unit 12 are adaptively updated so that both amplitude of the error signals to each of the output signals regenerated respectively from the first filter unit 11 and the second filter unit 12 may be further reduced. That is, by repeating this updating process, the second filter coefficient update unit 14 converges the filter coefficients of the second filter unit 12 until both amplitude of the error signals to each of the output signals becomes nearly the smallest.

Further, the first filter coefficient update unit 13 and the second filter coefficient update unit 14 calculate the error signals of each of the output signals regenerated respectively from the first filter unit 11 and the second filter unit 12, for example, as follows. That is, the error signals may calculate the error signals using the formula (1) defined in above-mentioned CMA or the function defined in non-patent document 1 or non-patent document 2.

Here, in a case where the first filter coefficient update unit 13 and the second filter coefficient update unit 14 do not use the relation between the elements of the characteristic matrix is as follows. That is, the filter coefficients which the first filter unit 11 uses are unrelated to the second output signal outputted from the second filter unit 12. Similarly, the filter coefficients which the second filter unit 12 uses are unrelated to the first output signal outputted from the first filter unit 11. For this reason, it is only the error signal to the first output signal that the first filter coefficient update unit 13 can reduce by updating the filter coefficients used in the first filter unit 11. Similarly, it is only the error signal to the second output signal that the second filter coefficient update unit 14 can also reduce by updating the filter coefficients used in the second filter unit 12.

Accordingly, the first filter coefficient update unit 13 and the second filter coefficient update unit 14 update each of the filter coefficients using the relation between the elements of the characteristic matrix.

When using the relation which exists between the elements of the characteristic matrix, the following relations are derived. That is, the relation between the filter coefficients of the first filter unit 11 to which predetermined elements of the characteristic matrix are applied and the filter coefficients of the second filter unit 12 to which different predetermined elements of the characteristic matrix as filter coefficients are applied is derived. As a result, the filter coefficients which the first filter unit 11 uses have the relation with the second output signal outputted from the second filter unit 12. Similarly, the filter coefficients which the second filter unit 12 uses will have the relation with the first output signal outputted from the first filter unit 11. Accordingly, the first filter coefficient update unit 13 can update the filter coefficients of the first filter unit 11 so that each of the error signals of both of the first output signal and the second output signal may be reduced. Similarly, the second filter coefficient update unit 14 can update the filter coefficients of the second filter unit 12 so that each of the error signals of both of the first output signal and the second output signal may be reduced.

Incidentally, by specifying the characteristics of the optical transmission path, the relation between the elements of the characteristic matrix can be derived. For example, in an ideal optical transmission path in which polarization dependability loss (Polarization Dependent Loss; PDL) does not exist, a relational expression which holds between the elements of the characteristic matrix by unitarity of the optical transmission path is derived.

Operation of the polarization separation device 1 configured as above will be described. Incidentally, it is supposed that the polarization separation device 1 starts the following operation when the first and second input signals detected from a received optical signal in the coherent optical receiver equipped with the polarization separation device 1 are inputted.

First, the first filter unit 11 applies filtering process on the first input signal and the second input signal with predetermined different elements of the characteristic matrix which expresses the inverse characteristics of the optical transmission path as the respective filter coefficients. And, the first filter unit 11 outputs, using each of signals after the filtering process having been applied, for example, a sum of the signals as the first output signal. Also, the second filter unit 12 applies filtering process on the first input signal and the second input signal with other predetermined different elements of the characteristic matrix which expresses the inverse characteristics of the optical transmission path as the respective filter coefficients. And, the second filter unit 12 outputs, using each of signals after the filtering process having been applied, for example, a sum of the signals as the second output signal.

Next, the first filter coefficient update unit 13 operates as follows using the relation between the elements of the characteristic matrix. That is, the first filter coefficient update unit 13 updates the filter coefficients of the first filter unit 11 so as to further reduce both amplitude of the error signals to each of the output signals regenerated respectively from the first filter unit 11 and the second filter unit 12.

Further, the second filter coefficient update unit 14 operates as follows using the relation between the elements of the characteristic matrix. That is, the second filter coefficient update unit 14 updates the filter coefficients of the second filter unit 12 so as to further reduce both amplitude of the error signals to each of the output signals regenerated respectively from the first filter unit 11 and the second filter unit 12.

By repeating the above mentioned operation, the polarization separation device 1 adaptively updates the filter coefficients of the first filter unit 11 and the second filter unit 12, and converges.

As described above, the polarization separation device as the first exemplary embodiment of the present invention can converge the filter coefficients which are used for polarization separating process of the received optical signal more quickly.

The reason will be described. The polarization separation device of the related art was updating the filter coefficients of the first filter unit only based on the error function of the output signal regenerated from the first filter unit. The polarization separation device of the related art was updating the filter coefficients of the second filter unit only based on the error function of the output signal regenerated from the second filter unit. In contrast, in the polarization separation device as the first exemplary embodiment of the present invention, the first and second filter coefficient update units use the relation between the elements of the characteristic matrix. Each of the filter coefficients are being updated adaptively so that both error signals of each of the optical signals regenerated from the first and second filter units may be reduced. Accordingly, the polarization separation device as the first exemplary embodiment of the present invention, compared with the related art, can reduce the time which needs before each filter coefficients are converged.

Second Exemplary Embodiment

A configuration of a polarization separation device 2 as a second exemplary embodiment of the present invention is shown in FIG. 2. In FIG. 2, the polarization separation device 2 includes filter units 21a-21d, adders 22a-22b and filter coefficient update units 23a-23b. Further, the filter units 21a and 21c and the adder 22a compose one exemplary embodiment of the first filter unit of the present invention. The filter units 21b and 21d and the adder 22b compose one exemplary embodiment of the second filter unit of the present invention. The filter coefficient update units 23a and 23b compose one exemplary embodiment of the first and second filter coefficient update units of the present invention respectively.

Further, the polarization separation device 2 is equipped in an coherent optical receiver similar to the coherent optical receiver equipped with the polarization separation device 1 as the first exemplary embodiment of the present invention. Further, according to this exemplary embodiment, it is supposed that the coherent optical receiver equipped with the polarization separation device 2 receives a polarization multiplexed signal of two independent optical signals multiplexed and transmitted by an optical transmitter. First and second input signals detected in the optical signal which have been received in the coherent optical receiver are inputted to the polarization separation device 2.

In FIG. 2, the filter units 21a-21d can be composed by FIR filters. Hereinafter, a case where the number of taps of FIR filter composing the filter units 21a-21d is 1 will be described.

The filter unit 21a applies filtering process on the first input signal with component-11 Wxx of Jones matrix as a filter coefficient. The filter unit 21c applies filtering process on the second input signal with component-21 Wyx of Jones matrix as a filter coefficient. The adder 22a outputs the summation of output signals of the filter unit 21a and the filter unit 21c as a first output signal. As a result, the first filter unit of the present invention configured by the filter units 21a and 21c and the adder 22a operates as follows. That is, an electric signal corresponding to one of the above-mentioned two independent optical signals is outputted as the first output signal using each of signals which filtering process has been applied on the first input signal and the second input signal.

The filter unit 21b applies filtering process on the first input signal with component-12 Wxy of Jones matrix as a filter coefficient. The filter unit 21d applies filtering process on the second input signal with component-22 Wyy of Jones matrix as a filter coefficient. The adder 22b outputs the summation of output signals of the filter unit 21b and the filter unit 21d as a second output signal. As a result, the second filter unit of the present invention configured by the filter units 21b, 21d and the adder 22b operates as follows. That is, an electric signal corresponding to the other of the above-mentioned two independent optical signals is outputted as the second output signal using each of signals which filtering process has been applied on the first input signal and the second input signal.

The filter coefficient update unit 23a operates as follows using the relation between the elements of the characteristic matrix obtained by unitarity of the optical transmission path. That is, the filter coefficients of the filter units 21a and 21c are updated so that each of the error signals of both of the first output signal and the second output signal may be reduced. Similarly, the filter coefficient update unit 23b operates as follows using the relation between the elements of the characteristic matrix obtained by unitarity of the optical transmission path. That is, the filter coefficients of the filter units 21b and 21d are updated so that each of the error signals of both of the first output signal and the second output signal may be reduced.

Specifically, the filter coefficient update units 23a and 23b update each of the filter coefficients so that the value of error function calculated based on both of an error signal of the first output signal and an error signal of the second output signal may be further reduced. For example, as shown in the following formula (3), the filter coefficient update units 23a and 23b may employ the summation $J(W, W_H)$ of the error signal Jy of the first output signal Ex' and the error signal Jx of the second output signal Ey' as the error function.

$$J(W, W^H) = E[(r_x^2 - |E'_x|^2)^2 + (r_y^2 - |E'_y|^2)^2] \quad \text{formula (3)}$$

And, the filter coefficient update units 23a and 23b apply the error function indicated in formula (3) as the error function in the update formula indicated in formula (2).

Here, in a case where the filter coefficient update units 23a and 23b do not use the relation between the elements of the characteristic matrix obtained by unitarity of the optical transmission path is as follows. That is, the filter coefficient Wxx of the filter unit 21a and the filter coefficient wyx of the filter unit 21c included in the first filter unit 11 are unrelated to the second output signal outputted from the second filter unit 12. Similarly, the filter coefficient Wxy of the filter unit 21b and the filter coefficient wyy of the filter unit 21d included in the second filter unit 12 are unrelated to the first output signal outputted from the first filter unit 11. For this reason, even if the filter coefficient update unit 23a tries to further reduce the summation of the error signals Jx and Jy, eventually, the filter coefficient update unit 23a updates the filter coefficients Wxx and Wyx so that only the error signal Jx may be reduced. Similarly, even if the filter coefficient update unit 23b also tries to further reduce the summation of the error signals Jx and Jy, eventually, the filter coefficient update unit 23b updates the filter coefficients Wxy and Wyy so that only the error signal Jy may be reduced. That is, in the case where the relation between the elements of the characteristic matrix obtained by unitarity of the optical transmission path is not used is as follows. That is, even if the error function indicated in formula (3) is applied to formula (2), the updating process performed by the filter coefficient update units 23a and 23b becomes equal to the process of using the update formula of formula (2).

Accordingly, the filter coefficient update units 23a and 23b update each of the filter coefficients using the relation between the elements of the characteristic matrix obtained by unitarity of the optical transmission path. The following formula (4) is a relational expression which holds between the elements of Jones matrix W obtained by unitarity of an ideal optical transmission path in which the above-mentioned PDL does not exist.

$$w_{yy} = w^*_{xx}$$

$$w_{yx} = -w^*_{xy} \quad \text{formula (4)}$$

Further, an example of the filter coefficient update formula using the relation between the elements of the characteristic matrix obtained by unitarity of the optical transmission path is indicated in the following formula (5).

$$W_{k+1}^H = W_k^H + \mu \nabla J(W, W^H) = \quad \text{formula (5)}$$

$$W_k^H + \mu \frac{\partial J(W, W^H)}{\partial W} = W_k^H + \mu \begin{pmatrix} \frac{\partial J}{\partial w_{xx}} & \frac{\partial J}{\partial w_{xy}} \\ \frac{\partial J}{\partial w_{yx}} & \frac{\partial J}{\partial w_{yy}} \end{pmatrix}$$

$$\nabla J(W, W^H) = \frac{\partial J}{\partial W} = \begin{pmatrix} \frac{\partial J}{\partial w_{xx}} & \frac{\partial J}{\partial w_{xy}} \\ \frac{\partial J}{\partial w_{yx}} & \frac{\partial J}{\partial w_{yy}} \end{pmatrix} = -2E\left[\begin{pmatrix} e_{xx} & e_{xy} \\ e_{yx} & e_{yy} \end{pmatrix}\right]$$

$$e_{xx} = (r_x^2 - |E_x'|^2)E_x'E_x^* + (r_y^2 - |E_y'|^2)E_y'E_y'^*$$

$$e_{xy} = -(r_x^2 - |E_x'|^2)E_y E_x'^* + (r_y^2 - |E_y'|^2)E_y'E_x^*$$

$$e_{yx} = (r_x^2 - |E_x'|^2)E_x'E_y^* - (r_y^2 - |E_y'|^2)E_x E_y'^*$$

$$e_{yy} = (r_x^2 - |E_x'|^2)E_x E_x'^* + (r_y^2 - |E_y'|^2)E_y'E_y^*$$

Formula (5) is the update formula obtained by applying the error function indicated in formula (3) and the relational expression between the elements indicated in formula (4) to the update formula of formula (2). By using the update formula indicated in formula (5), the filter coefficient update units 23a and 23b operate as follows. That is, all elements of Jones matrix W as the filter coefficients of each of the filter units 21a-21d can be updated so that each of the error functions Jx and Jy of both of the first output signal Ex' and the second output signal Ey' may be further reduced.

Operation of the polarization separation device 2 configured as above will be described. Further, it is supposed that the polarization separation device 2 starts the following operation when the first and second input signals detected from a received optical signal in the coherent optical receiver equipped with the polarization separation device 2 are inputted.

First, the filter unit 21a applies filtering process on the first input signal with component-11 Wxx of Jones matrix as a filter coefficient. The filter unit 21c applies filtering process on the second input signal with component-21 Wyx of Jones matrix as a filter coefficient. And, the adder 22a adds the outputs of the filter units 21a and 21c and outputs as the first output signal.

Also, the filter unit 21b applies filtering process on the first input signal with component-12 Wxy of Jones matrix as a filter coefficient. The filter unit 21d applies filtering process on the second input signal with component-22 Wyy of Jones matrix as a filter coefficient. And, the adder 22b adds the outputs of the filter units 21b and 21d and outputs as the second output signal.

Next, the filter coefficient update unit 23a uses a relational expression between the elements of the characteristic matrix obtained by unitarity. Each of the filter coefficients of the filter units 21a and 21c is updated so that the summation of the error signals to the first and second output signals may be reduced. For example, the filter coefficient update unit 23a updates each of the relevant filter coefficients using the update formula indicated in formula (5).

Also, the filter coefficient update unit 23b uses the relation between the elements of the characteristic matrix obtained by unitarity. Each of the filter coefficients of the filter units 21b and 21d is updated so that the summation of the error signals to the first and second output signals may be reduced. For example, the filter coefficient update unit 23b updates each of the relevant filter coefficients using the update formula indicated in formula (5).

By repeating the above mentioned operation, the polarization separation device 2 updates the filter coefficients of each of the filter units 21a-21d, and converges.

Figure 3A:
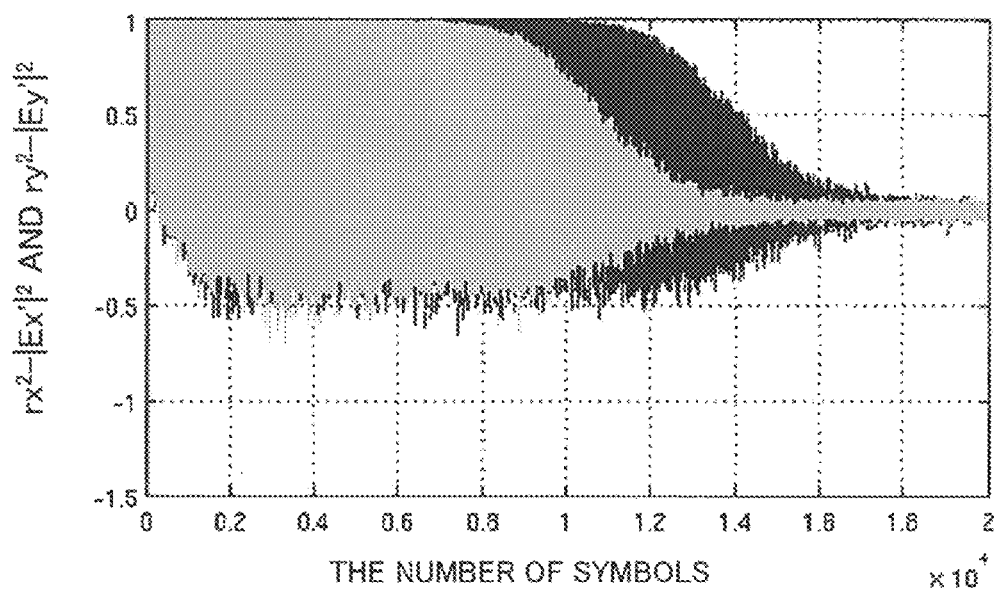
FIGS. 3A and 3B are graphs illustrating each of results of simulation of polarization separating process by the polarization separation device of the related art and the polarization separation device as the second exemplary embodiment of the present invention.
Figure 3B:
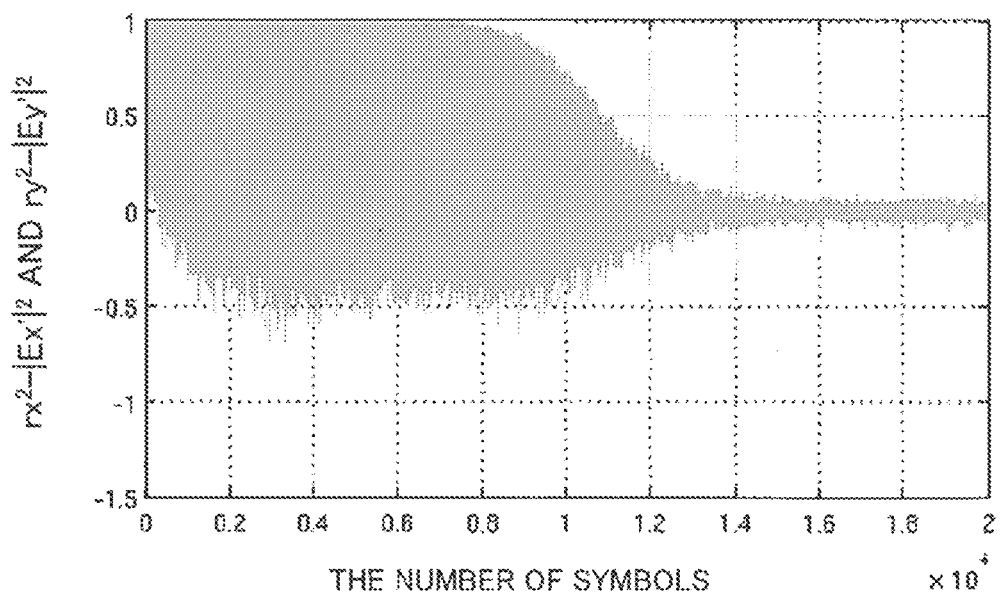

Next, a result of simulation using the polarization separation device 2 as the second exemplary embodiment of the present invention will be described. FIGS. 3A and 3B are figures of the simulation of polarization separating process by using the polarization separation device 94 of the related art shown in FIG. 5 and the polarization separation device 2 as this second exemplary embodiment respectively. FIGS. 3 (a) and 3B are graphs indicating time changes of the values of error functions Jx and Jy. Further, in FIG. 3, a vertical axis represents the value of $r_x^2-|Ex'|^2$ and $r_y^2-|Ey'|^2$, not the value of the error function itself. This is because these values are needed in the filter coefficient update formula. Accordingly, these values will become the value of error function by squaring. A horizontal axis represents the number of symbols that polarization separating process has performed.

In FIGS. 3A and 3B, for a while just after the simulation starting, both values of $r_x^2-|Ex'|^2$ (gray line) and $r_y^2-|Ey'|^2$ (black line)(the values corresponding to each of the error functions Jx and Jy) take the value between from −0.5 to 1. After that, the values of $r_x^2|Ex'|^2$ and $r_y^2-|Ey'|^2$ come to take the value of approximately zero. At this point, it is found out that estimating process of each of the filter coefficients, that is, polarization separating process has been completed.

In a result of simulation of the related art of FIG. 3A, time until the value of Jy will be zero is long compared with Jx. Accordingly, it is found out that the polarization separation device 94 of the related art needs a lot of time before outputting the second output signal correctly.

On the other hand, in a result of simulation of the second exemplary embodiment of the present invention of FIG. 3B, the time changes of the and values of $r_x^2-|Ex'|^2$ and $r_y^2-|Ey'|^2$ (that is, the values of Jx and Jy) are almost identical. That is, according to the second exemplary embodiment of the present invention, it is found out that the filter coefficient update units 23a and 23b have completed estimating process of the filter coefficients at almost identical timing. Further, time until the values of $r_x^2-|Ex'|^2$ and $r_y^2-|Ey'|^2$ (that is, the values of Jx and Jy) will be 0 is early compared with FIG. 3B. From this thing, it is found out that the polarization separation device 2 as the second exemplary embodiment of the present invention estimates each of the filter coefficients in a short time compared with the polarization separation device 94 of the related art.

As described above, the polarization separation device as the second exemplary embodiment of the present invention can separate the polarization multiplexed optical signal of two independent optical signals more quickly with high accuracy.

The reason is because the first and second filter coefficient update units use the relation between the elements of the characteristic matrix obtained by unitarity of the optical transmission path. As a result, the filter coefficients are being updated adaptively so that both of the error signals of each of the output signals regenerated from the first and second filter units may be reduced. Accordingly, the polarization separation device as the second exemplary embodiment of the present invention can reduce time to need until the filter coefficients are converged.

Further, in the polarization separating process of the related art, there was a problem that the polarization separating process of the related art sometimes does not converge on a correct filter coefficient. Further, in the polarization separating process of the related art, there was a problem that the polarization separating process of the related art sometimes outputs an electric signal corresponding to only one of two independent optical signals, but not two independent optical signals. That is, in the polarization separating process of the related art, there was a problem that the polarization separating process of the related art sometimes cannot separate two independent optical signals correctly.

In contrast, the polarization separation device 2 as the second exemplary embodiment of the present invention can separate two independent optical signals with more high accuracy.

The reason will be described. When the relational expression between the elements of the characteristic matrix obtained by unitarity holds, the condition of the filter coefficient in a case where identical signals are outputted as the first and second output signals will be W=0. This means that the first and second output signals always become zero. Accordingly, it is because the polarization separation device as the second exemplary embodiment of the present invention can decrease the possibility that the identical signals are outputted as the first and second output signals. Further, it is because the polarization separation device as the second exemplary embodiment of the present invention can decrease the possibility that an incorrect filter coefficient is estimated.

Further, in a description of this exemplary embodiment, the filter coefficient update units 23a and 23b may employ, as the relation between the elements of the characteristic matrix, only any one of two formulas indicated in formula (4) which represent the relation obtained by unitarity of the optical transmission path. Further, the relational expression between the elements of the characteristic matrix used by the filter coefficient update units 23a and 23b is not limited to the relation obtained by unitarity. Further, when the characteristics of the optical transmission path is identified, the relational expression existing between the elements of the matrix which represents inverse characteristics of the characteristics of the optical transmission path can be derived.

Third Exemplary Embodiment

Next, a third exemplary embodiment of the present invention will be described in detail with reference to drawings. The second exemplary embodiment of the present invention has described about an example which supposed that PDL does not exist in an optical transmission path. However, although the existence of PDL in the optical transmission path is not desirable, a little PDL may exist in an actual optical communication system. This exemplary embodiment will describe about a polarization separation device which assumes the existence of PDL in the optical transmission path.

A polarization separation device 3 as the third exemplary embodiment of the present invention includes the same compositions as the polarization separation device 2 described using FIG. 2 as the second exemplary embodiment of the present invention. However, the update formula of filter coefficients which the filter coefficient update units 23a and 23b use is different.

The filter coefficient update units 23a and 23b in the third exemplary embodiment of the present invention operate as follows with using a relational expression between elements of a characteristic matrix obtained by unitarity. That is, the filter coefficient update unit updates each of the filter coefficients so that the linear summation of each of the error signals to the first and second output signals may be reduced. For example, the filter coefficient update units 23a and 23b in the third exemplary embodiment of the present invention update each of the filter coefficients using the update formula indicated in the following formula (6).

$$W_{k+1}^H = W_k^H + \begin{pmatrix} \mu_x \frac{\partial J_x}{\partial w_{xx}} + \mu_y \frac{\partial J_y}{\partial w_{xx}} & \mu_x \frac{\partial J_x}{\partial w_{xy}} + \mu_y \frac{\partial J_y}{\partial w_{xy}} \\ \mu_x \frac{\partial J_x}{\partial w_{yx}} + \mu_y \frac{\partial J_y}{\partial w_{yx}} & \mu_x \frac{\partial J_x}{\partial w_{yy}} + \mu_y \frac{\partial J_y}{\partial w_{yy}} \end{pmatrix} \quad \text{formula (6)}$$

Here, $\mu_x$ and $\mu_y$ are parameters which adjust the power of influence of the error signal of each of the output signals.

Operation of the polarization separation device 3 configured as above is similar to operation of the polarization separation device 2 as the second exemplary embodiment of the present invention, except that the filter coefficient update units 23a and 23b are different in a point of using formula (6) instead of formula (5).

Next, the effect of the third exemplary embodiment of the present invention is described. Even if PDL exists, the polarization separation device as the third exemplary embodiment of the present invention can separate a polarization multiplexed optical signal of two independent optical signals more quickly with high accuracy.

The reason is as follows. That is, the first and second filter coefficient update units update the filter coefficients, while using the relational expression between the elements of the characteristic matrix obtained by unitarity, so that the linear summation of the error signals of the output signals regenerated from each of the filter units may be reduced. Here, the relational expression between the elements of the characteristic matrix obtained by unitarity holds to some extent if PDL is small. Accordingly, the linear summation of each of the error signals is being employed as the error function while using the relational expression between the elements of the characteristic matrix obtained by unitarity. The influence of the error signal of the other output signal can be reduced in each of the filter coefficient update units. As a result, the polarization separation device as the third exemplary embodiment of the present invention can remove the influence of PDL to some extent.

Incidentally, the filter coefficient update units 23a and 23b may employ, as the error function, not only the linear summation of error functions of each of the first and second output signals, but also the nonlinear summation of a square, a square root of each of the error signals or an index function or the like of the error function.

Fourth Exemplary Embodiment

Next, a fourth exemplary embodiment of the present invention will be described in detail with reference to drawings. The second and third exemplary embodiments of the present invention have described about the polarization separation device which is equipped in the coherent optical receiver which receives a polarization multiplexed optical signal of two independent optical signals. However, as an optical communication system using an optical digital coherent communication system, it is also considered an optical communication system which does not use a polarization multiplexed system, that is, which uses an optical signal of single-polarization (hereinafter, described as a single-polarization system). Preparing digital signal processing processors dedicated to each of these optical communication systems causes a problem of device cost increase. Therefore, it is desirable that the polarization separation device to be implemented by the digital signal processing processor is supporting both of the single-polarization system and the polarization multiplexed system. Accordingly, in this exemplary embodiment, the polarization separation device equipped in the coherent optical receiver in the optical communication system of the single-polarization system will be described.

A polarization separation device 4 as the fourth exemplary embodiment of the present invention includes the same function blocks as the polarization separation device 2 described using FIG. 2 as the second exemplary embodiment of the present invention. However, the update formula of filter coefficients which the filter coefficient update units 23*a* and 23*b* use is different The filter coefficient update units 23*a* and 23*b* in the fourth exemplary embodiment of the present invention update each of the filter coefficients using the update formula of filter coefficients in which either one of values of $r_x$ and $r_y$ is set to 0 in formula (5). As a result, the polarization separation device 4 as the fourth exemplary embodiment of the present invention can regenerate, from either one of the first output signal and the second output signal, an electric signal corresponding to a transmitted optical signal.

Thus, the polarization separation device as the fourth exemplary embodiment of the present invention can be applied to whichever of the optical communication systems employing the polarization multiplexed system and the single-polarization system.

Incidentally, in each of the first to third exemplary embodiments of the present invention, the example has been described that the polarization separation device is provided with both of the first and second filter coefficient update units in the present invention. However, the polarization separation device as each of the exemplary embodiments may be provided with either of the first and second filter coefficient update units in the present invention. In this case, the polarization separation device as each of the exemplary embodiments may update the coefficients of other filter unit using, for example, such a filter coefficient update unit of the related art as shown in FIG. 5. The polarization separation device as each of the exemplary embodiments of such a configuration updates the filter coefficients by at least one filter coefficient update unit so that both of the error signals of the output signals from each of the filter units may be reduced. Accordingly, the speed to reduce both of the error signals can be improved more than something according to the related art.

Further, in each of the second to fourth exemplary embodiments of the present invention, the description has been made with supposing that the number of taps of filter applied to each filter unit is one, however, the filter having 2 or more taps can also be applied to the first and second filter units of the present invention. In this case, Jones matrix having 2×2=4 components is set to each tap of each of the filters composing the first and second filter units. For example, in case of 3 taps, it is supposed that each component of Jones matrix is Aij, Bij, Cij. Then, Ex' and Ey', which are amplitude of the first and second output signals, are represented like the following formula (7) using the input signals Ex[k], Ey[k] and Jones matrix.

$$E'_x = A_{11}E_x[k+1] + B_{11}E_x[k] + C_{11}E_x[k-1] + A_{12}E_y[k+1] + B_{12}E_y[k] + C_{12}E_y[k-1]$$

$$E'_y = A_{21}E_x[k+1] + B_{21}E_x[k] + C_{21}E_x[k-1] + A_{22}E_y[k+1] + B_{22}E_y[k] + C_{22}E_y[k-1] \quad \text{formula (7)}$$

Here, k expresses the time.

Further, A11, B11 and C11 will often become time symmetric focusing on the coefficient of the center tap (B11) (i.e. A11=C11). For this reason, it is desirable that the usual number of taps is to be set to an odd number.

By applying Ex' and Ey' represented in this way to the filter coefficient update formula, the polarization separation device as each of the exemplary embodiments can update the filter coefficients almost similarly to the case where the number of taps is one. However, in the filter coefficient update formula of formula (5), when updating Aij, Ex, Ey are replaced with Ex[k+1], Ey[k+1] respectively in the calculation formula of eij. Similarly, when updating Bij, Ex, Ey are replaced with Ex[k], Ey[k] respectively in the calculation formula of eij. Similarly, when updating Cij, Ex, Ey are replaced with Ex[k−1], Ey[k−1] respectively in the calculation formula of eij.

Further, assuming that data which has already been polarization separated is inputted first and Jones matrix of each of taps is time symmetric for each of components, an initial value of the filter coefficient of each tap may be as below. That is, component-11 and component-22 of Jones matrix of the center tap may be 1, and other coefficients may be 0.

In the above, although the polarization separating method of the polarization multiplexed QPSK signal using the error function indicated in formula (1) has been described, the present invention is applicable as long as Ex and Ey are included in the original error functions Jx and Jy. For example, because Ex and Ey are also included in the error function of the above-mentioned decision-directed method which is being applied to 16QAM, the present invention can be put into effect.

Further, although it has been assumed a dedicated communication device in each of the exemplary embodiments described up to here, the following may also be fine. That is, for example, a board or a card which performs the processing corresponding to the present exemplary embodiment is installed in a personal computer apparatus which performs various data processing, and the processing is carried out on the computer side. In this way, it may make the personal computer apparatus implement software for performing the processing, and thereby make a configuration which performs the processing corresponding to the present exemplary embodiment.

With respect to the program which is implemented by a data processing device such as the personal computer apparatus, the program may be distributed via various recording (memory) media such as an optical disc and a memory card. Or, the program may be distributed via a communication means such as the internet.

Each of the exemplary embodiments described above can be combined with the other exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application claims priority based on Japanese Patent Application No. 2011-019908 filed on Feb. 1, 2011, the disclosure of which is hereby incorporated by reference in its entirety.

Although a part or all of the exemplary embodiments mentioned above can also be described as the following supplementary notes, they are not limited to the following.

Further Exemplary Embodiment 1

An optical receiver which performs polarization separating process of an optical signal using a polarization separation device, which polarization separation device comprising:

a first filter means which applies filtering process on each of a first input signal and a second input signal which are detected from an optical signal received via an optical transmission path with elements of a characteristic matrix representing an inverse characteristics of said optical transmission path as filter coefficients, and uses each of the filtered signals to output a first output signal;

a second filter means which applies filtering process on each of said first input signal and said second input signal with different elements from the elements of said characteristic matrix as filter coefficients, and uses each of the filtered signals to output a second output signal; and a first filter coefficient update means which update repeatedly and converges the filter coefficients of said first filter means so as to further reduce both error signals which represent errors to each of target values of said first output signal and said second output signal by using a relation between the elements of said characteristic matrix and said different elements.

Further Exemplary Embodiment 2

The optical receiver according to further exemplary embodiment 1, wherein said polarization separation device further comprises:

a second filter coefficient update means which converges the filter coefficients of said second filter means by updating repeatedly so as to further reduce both of said error signals to each of said first output signal and said second output signal by using the relation between the elements of said characteristic matrix and said different elements.

Further Exemplary Embodiment 3

The optical receiver according to further exemplary embodiment 1 or further exemplary embodiment 2, wherein at least either one of said first and said second filter coefficient update means updates said filter coefficients by applying a relation obtained from unitarity of said optical transmission path as the relation between the elements of said characteristic matrix.

Further Exemplary Embodiment 4

The optical receiver according to either of further exemplary embodiment 1 to further exemplary embodiment 3, wherein at least either one of said first and said second filter coefficient update means updates said filter coefficients so as to further reduce the linear summation of said error signals of each of said first output signal and said second output signal.

Further Exemplary Embodiment 5

The optical receiver according to further exemplary embodiment 3, wherein at least either one of said first and said second filter coefficient update means updates said filter coefficients based on the following formula.

$$W_{k+1}^H =$$

$$W_k^H + \mu \nabla J(W, W^H) = W_k^H + \mu \frac{\partial J(W, W^H)}{\partial W} = W_k^H + \mu \begin{pmatrix} \frac{\partial J}{\partial w_{xx}} & \frac{\partial J}{\partial w_{xy}} \\ \frac{\partial J}{\partial w_{yx}} & \frac{\partial J}{\partial w_{yy}} \end{pmatrix}$$

$$\nabla J(W, W^H) = \frac{\partial J}{\partial W} = \begin{pmatrix} \frac{\partial J}{\partial w_{xx}} & \frac{\partial J}{\partial w_{xy}} \\ \frac{\partial J}{\partial w_{yx}} & \frac{\partial J}{\partial w_{yy}} \end{pmatrix} = -2E\left[\begin{pmatrix} e_{xx} & e_{xy} \\ e_{yx} & e_{yy} \end{pmatrix}\right]$$

$$e_{xx} = (r_x^2 - |E_x'|^2)E_x'E_x^* + (r_y^2 - |E_y'|^2)E_y E_y'^*$$

$$e_{xy} = -(r_x^2 - |E_x'|^2)E_y E_x'^* + (r_y^2 - |E_y'|^2)E_y' E_x^*$$

$$e_{yx} = (r_x^2 - |E_x'|^2)E_x' E_y^* - (r_y^2 - |E_y'|^2)E_x E_y'^*$$

$$e_{yy} = (r_x^2 - |E_x'|^2)E_x E_x'^* + (r_y^2 - |E_y'|^2)E_y' E_y^*$$

Further Exemplary Embodiment 6

The optical receiver according to either of further exemplary embodiment 1 to further exemplary embodiment 5, wherein when said optical signal received by said optical receiver is a polarization multiplexed optical signal of two independent optical signals having orthogonal polarization states and identical carrier wave optical frequencies, said first filter means outputs a signal corresponding to one of said two independent optical signals as said first output signal, and said second filter means outputs a signal corresponding to the other of said two independent optical signals as said second output signal.

Further Exemplary Embodiment 7

The optical receiver according to either of further exemplary embodiment 2 to further exemplary embodiment 5, wherein when said optical signal received by said optical receiver is a single-polarization optical signal, said first and said second filter coefficient update means update each of the filter coefficients of said first and second filter means based on the error signal which is expected that either one of values of said first output signal and said second output signal becomes zero.

Further Exemplary Embodiment 8

A polarization separation device used in an optical receiver which receives an optical signal via an optical transmission path, comprising:

a first filter means which applies filtering process on each of a first input signal and a second input signal which are detected from said optical signal by said optical receiver with elements of a characteristic matrix representing the inverse characteristics of said optical transmission path as filter coefficients, and uses each of the filtered signals to output a first output signal;

a second filter means which applies filtering process on each of said first input signal and said second input signal with different elements from the elements of said characteristic matrix as filter coefficients, and uses each of the filtered signals to output a second output signal; and a first filter coefficient update means which converges the filter coefficients of said first filter means by updating repeatedly so as to further reduce both error signals which represent errors to each of target values of said first output signal and said second output signal by using a relation between the elements of said characteristic matrix and said different elements.

Further Exemplary Embodiment 9

The polarization separation device according to further exemplary embodiment 8, further comprising:

a second filter coefficient update means which converges the filter coefficients of said second filter means by updating repeatedly so as to further reduce both of said error signals to each of said first output signal and said second output signal by using the relation between the elements of said characteristic matrix and said different elements.

Further Exemplary Embodiment 10

A polarization separating method of a received optical signal, comprising:

applying filtering process on each of a first input signal and a second input signal which are detected from said received optical signal, with elements of a characteristic matrix representing an inverse characteristics of an optical transmission path, from which said received optical signal having been received, as first filter coefficients, and outputting a first output signal using each of the filtered signals;

applying filtering process on each of said first input signal and said second input signal with different elements from the elements of said characteristic matrix as second filter coefficients, and outputting a second output signal using each of the filtered signals; and converging said first filter coefficients by updating so as to further reduce both error signals to said first output signal and said second output signal by using a relation between the elements of said characteristic matrix and said different elements.

Further Exemplary Embodiment 11

The polarization separating method according to further exemplary embodiment 10, further comprising:

converging said second filter coefficients by updating so as to further reduce both error signals to said first output signal and said second output signal by using the relation between the elements of said characteristic matrix and said different elements.

INDUSTRIAL APPLICABILITY

The present invention relates to an optical receiver, a polarization separation device and a polarization separating method in a polarization multiplex and demultiplex optical communication system, and has industrial applicability.

REFERENCE SIGN LIST 1, 2, 3, 4, 94 polarization separation device
11 first filter unit
12 second filter unit
13 first filter coefficient update unit
14 second filter coefficient update unit
21a, 21b, 21c, 21d filter unit
22a, 22b adder
23a, 23b filter coefficient update unit
90 optical receiver
91 90-degree hybrid
92a, 92b, 92c, 92d photoelectric detector
93a, 93b, 93c, 93d ADC
95a, 95b optical carrier wave frequency deviation and optical phase deviation compensation unit
96a, 96b symbol discrimination unit
901a, 901b, 901c, 901d filter unit
902a, 902b filter coefficient update unit

The invention claimed is:

1. An optical receiver comprising:
    a coherent receiving unit which outputs a first input signal and a second input signal which have a polarization state parallel to each of two polarization axes orthogonal to each other, from a polarization multiplexed optical signal via an optical transmission path; and
    a polarization separation device including:
        a first filter unit which applies filtering process on each of a first input signal and said second input signal, which are detected from an optical signal received via an optical transmission path, with elements of a characteristic matrix representing an inverse characteristics of said optical transmission path as filter coefficients, and uses each of the filtered signals to output a first output signal;
        a second filter unit which applies filtering process on each of said first input signal and said second input signal with different elements from the elements of said characteristic matrix as filter coefficients, and uses each of the filtered signals to output a second output signal; and
        a first filter coefficient update unit which updates repeatedly and converges the filter coefficients of said first filter unit so as to further reduce both error signals which represent errors to each of target values of said first output signal and said second output signal by using a relation between the elements of said characteristic matrix and said different elements.

2. The optical receiver according to claim 1, wherein said polarization separation device further comprises:
    a second filter coefficient update unit which converges the filter coefficients of said second filter unit by updating repeatedly so as to further reduce both of said error signals to each of said first output signal and said second output signal by using the relation between the elements of said characteristic matrix and said different elements.

3. The optical receiver according to claim 1, wherein at least either one of said first and said second filter coefficient update unit updates said filter coefficients by applying a relation obtained from unitarity of said optical transmission path as the relation between the elements of said characteristic matrix.

4. The optical receiver according to claim 1, wherein at least either one of said first and said second filter coefficient update unit updates said filter coefficients so as to further reduce the linear summation of said error signals of each of said first output signal and said second output signal.

5. The optical receiver according to claim 1,
    wherein said filter coefficients includes a first filter coefficient used to perform said filtering processing of said first input signal, and a third filter coefficient used to perform said filtering processing of said second input signal, which filter coefficients are used for outputting said first signal,
    wherein said filter coefficients includes a second filter coefficient used to perform said filtering processing of said first input signal, and a fourth filter coefficient used to perform said filtering processing of said second input signal, which filter coefficients are used for outputting said second signal, and
    wherein when a matrix $W_k$ which comprises said first to said fourth filter coefficients which has not been updated is defined as $$W_k = \begin{pmatrix} w_{xx} & w_{xy} \\ w_{yx} & w_{yy} \end{pmatrix},$$

μ is a constant, and E[x] is an expectation value of x,
a matrix $W_{k+1}$ which comprises said first to said fourth filter coefficients which have been updated is indicated as $$W_{k+1} = W_k - 2\mu E\left[\begin{pmatrix} e_{xx} & e_{xy} \\ e_{yx} & e_{yy} \end{pmatrix}\right]$$

where $e_{xx} = (r_x^2 - |E'_x|^2)E'_x E^*_x + (r_y^2 - |E'_y|^2)E_y E'^*_y$ $e_{xy} = -(r_x^2 - |E'_x|^2)E_y E'^*_x + (r_y^2 - |E'_y|^2)E'_y E^*_x$ $e_{yx} = (r_x^2 - |E'_x|^2)E'_x E^*_y - (r_y^2 - |E'_y|^2)E_x E'^*_y$ $e_{yy} = (r_x^2 - |E'_x|^2)E_x E'^*_x + (r_y^2 - |E'_y|^2)E'_y E^*_y$ wherein
$r_x$ and $r_y$ are target amplitude values of said first output signal and said second output signal respectively,
$E_x$ and $E_y$ are amplitude values of said first input signal and said second input signal respectively,
$E'_x$ and $E'_y$ are amplitude values of said first output signal and said second output signal respectively.

6. The optical receiver according to claim 1, wherein when said optical signal received by said optical receiver is a polarization multiplexed optical signal of two independent optical signals having orthogonal polarization states and identical carrier wave optical frequencies,
said first filter unit outputs a signal corresponding to one of said two independent optical signals as said first output signal, and
said second filter unit outputs a signal corresponding to the other of said two independent optical signals as said second output signal.

7. The optical receiver according to claim 1, wherein when said optical signal received by said optical receiver is a single-polarization optical signal,
said first and said second filter coefficient update unit update each of the filter coefficients of said first and second filter unit based on the error signal which is expected that either one of values of said first output signal and said second output signal becomes zero.

8. A polarization separation device used in an optical receiver which receives a polarization multiplexed optical signal via an optical transmission path, comprising:
a first filter unit which applies filtering process on each of a first input signal and a second input signal which have a polarization state parallel to each of two polarization axes orthogonal to each other, which are detected from said polarization multiplexed optical signal by said optical receiver, with elements of a characteristic matrix representing an inverse characteristics of said optical transmission path as filter coefficients, and uses each of the filtered signals to output a first output signal;
a second filter unit which applies filtering process on each of said first input signal and said second input signal with different elements from the elements of said characteristic matrix as filter coefficients, and uses each of the filtered signals to output a second output signal; and
a first filter coefficient update unit which converges the filter coefficients of said first filter unit by updating repeatedly so as to further reduce both error signals which represent errors to each of target values of said first output signal and said second output signal by using a relation between the elements of said characteristic matrix and said different elements.

9. The polarization separation device according to claim 8, further comprising:
a second filter coefficient update unit which converges the filter coefficients of said second filter unit by updating repeatedly so as to further reduce both of said error signals to each of said first output signal and said second output signal by using the relation between the elements of said characteristic matrix and said different elements.

10. A polarization separating method of a received polarization multiplexed optical signal via an optical transmission path comprising:
applying filtering process on each of a first input signal and a second input signal which have a polarization state parallel to each of two polarization axes orthogonal to each other, which are detected from said received polarization multiplexed optical signal, with elements of a characteristic matrix representing an inverse characteristics of an optical transmission path, from which said received optical signal having been received, as first filter coefficients, and outputting a first output signal using each of the filtered signals;
applying filtering process on each of said first input signal and said second input signal with different elements from the elements of said characteristic matrix as second filter coefficients, and outputting a second output signal using each of the filtered signals; and
updating and converging said first filter coefficients so as to further reduce both of error signals which represent errors between each of target values of said first output signal and said second output signal and said first output signal and said second output signal by using a relation between the elements of said characteristic matrix and said different elements.

11. The polarization separating method according to claim 10, further comprising:
converging said second filter coefficients by updating so as to further reduce both error signals to said first output signal and said second output signal by using the relation between the elements of said characteristic matrix and said different elements.

* * * * *